(12) United States Patent
Nicholson et al.

(10) Patent No.: US 9,432,329 B2
(45) Date of Patent: Aug. 30, 2016

(54) NETWORK ADDRESS ASSIGNMENT WITH DUPLICATION DETECTION

(71) Applicant: NetApp Inc., Sunnyvale, CA (US)

(72) Inventors: Timothy Eric Nicholson, Raleigh, NC (US); Eric Peter Dutko, Hillsborough, NC (US); Jeffrey Alan Fultz, El Dorado Hills, CA (US); Brian Hackworth, San Jose, CA (US)

(73) Assignee: NETAPP, INC., Sunnyvale, CA (US)

( * ) Notice: Subject to any disclaimer, the term of this patent is extended or adjusted under 35 U.S.C. 154(b) by 384 days.

(21) Appl. No.: 14/026,735

(22) Filed: Sep. 13, 2013

(65) Prior Publication Data

US 2015/0081853 A1    Mar. 19, 2015

(51) Int. Cl.
*H04L 29/12*    (2006.01)

(52) U.S. Cl.
CPC ....... *H04L 61/2015* (2013.01); *H04L 61/2092* (2013.01)

(58) Field of Classification Search
None
See application file for complete search history.

(56) References Cited

U.S. PATENT DOCUMENTS

| | | | | |
|---|---|---|---|---|
| 7,281,036 B1* | 10/2007 | Lu | ..................... | H04L 29/12028 709/220 |
| 8,412,198 B2* | 4/2013 | Jang | .................. | H04L 29/12311 370/331 |
| 8,452,895 B2* | 5/2013 | Ito | ................................ | 370/254 |
| 2005/0265354 A1* | 12/2005 | Ryu | ................... | H04L 29/12009 370/395.52 |
| 2006/0015596 A1* | 1/2006 | Mar | .................... | H04L 61/2092 709/222 |
| 2007/0299942 A1* | 12/2007 | Lu | ..................... | H04L 29/12028 709/220 |
| 2009/0106404 A1* | 4/2009 | Christenson | ...... | H04L 29/12952 709/222 |
| 2012/0290731 A1* | 11/2012 | Suumaki | ............ | H04L 61/2007 709/228 |
| 2013/0007233 A1* | 1/2013 | Lv | ....................... | H04L 61/2038 709/222 |
| 2013/0294230 A1* | 11/2013 | Popa | ..................... | H04L 47/762 370/230 |
| 2013/0294284 A1* | 11/2013 | Popa | ..................... | H04L 63/065 370/254 |
| 2013/0332586 A1* | 12/2013 | Masputra | ............. | H04L 69/167 709/220 |
| 2015/0016416 A1* | 1/2015 | Hawkes | ........... | H04W 36/0016 370/331 |

* cited by examiner

*Primary Examiner* — Natisha Cox
(74) *Attorney, Agent, or Firm* — Klein, O'Neill & Singh, LLP

(57) ABSTRACT

Network storage system configuration via a network is disclosed. A network address assignment component is configured to listen for network discovery requests over the network. Responsive to receiving a network discovery request from a network storage system, one or more candidate network addresses are (e.g., randomly) generated until an available candidate network address is generated. For example, if a first candidate network address is determined as available (e.g., not used by another device within the network), then the first candidate network address is offered and/or assigned to the network storage system as an initial configuration network address that may be used to provide configuration access to the network storage system, otherwise a second candidate network address is generated and/or evaluated for availability. As such, configuration access may be provided over the network to the network storage system regardless of whether the network comprises an IP address assigning (e.g., DHCP) server.

20 Claims, 12 Drawing Sheets

NETWORK ADDRESS ASSIGNMENT WITH DUPLICATION DETECTION

BACKGROUND

One or more client devices may connect to one another over a network. For example, employees of a company may use assigned client devices to connect to a company network to access company resources, such as a database server or an email server. The network may comprise network storage, such as a network storage system comprising one or more storage devices (e.g., a storage controller comprising one or more storage drives). When a network storage system is installed on the network, the network storage system may initially lack a configuration that may otherwise allow the network storage system to operate over the network. For example, the network storage system may lack an IP address, a system name, a domain name, network interface information, domain name server (DNS) information, data volumes, etc. If the network does not comprise a dynamic host control protocol (DHCP) server capable of assigning IP addresses to devices on the network, then IP assignment requests (e.g., a request seeking an assignment of an IP address) sent over the network by the network storage system may go unanswered. Without an IP address, a configuration tool (e.g., a configuration software application hosted on an IT administrator computer or any other computing device on the network) may be unable to access the network storage system. Thus, if the network does not comprise a DHCP server, then a user, such as IT administrator or network specialist, may have to physically connect to the network storage system, such as through a serial cable, to configure the network storage system. If the network storage system does not comprise a configuration user interface, then the configuration may have to be done through command line instructions, which may be unintuitive and/or complex.

DETAILED DESCRIPTION

Figure 1:
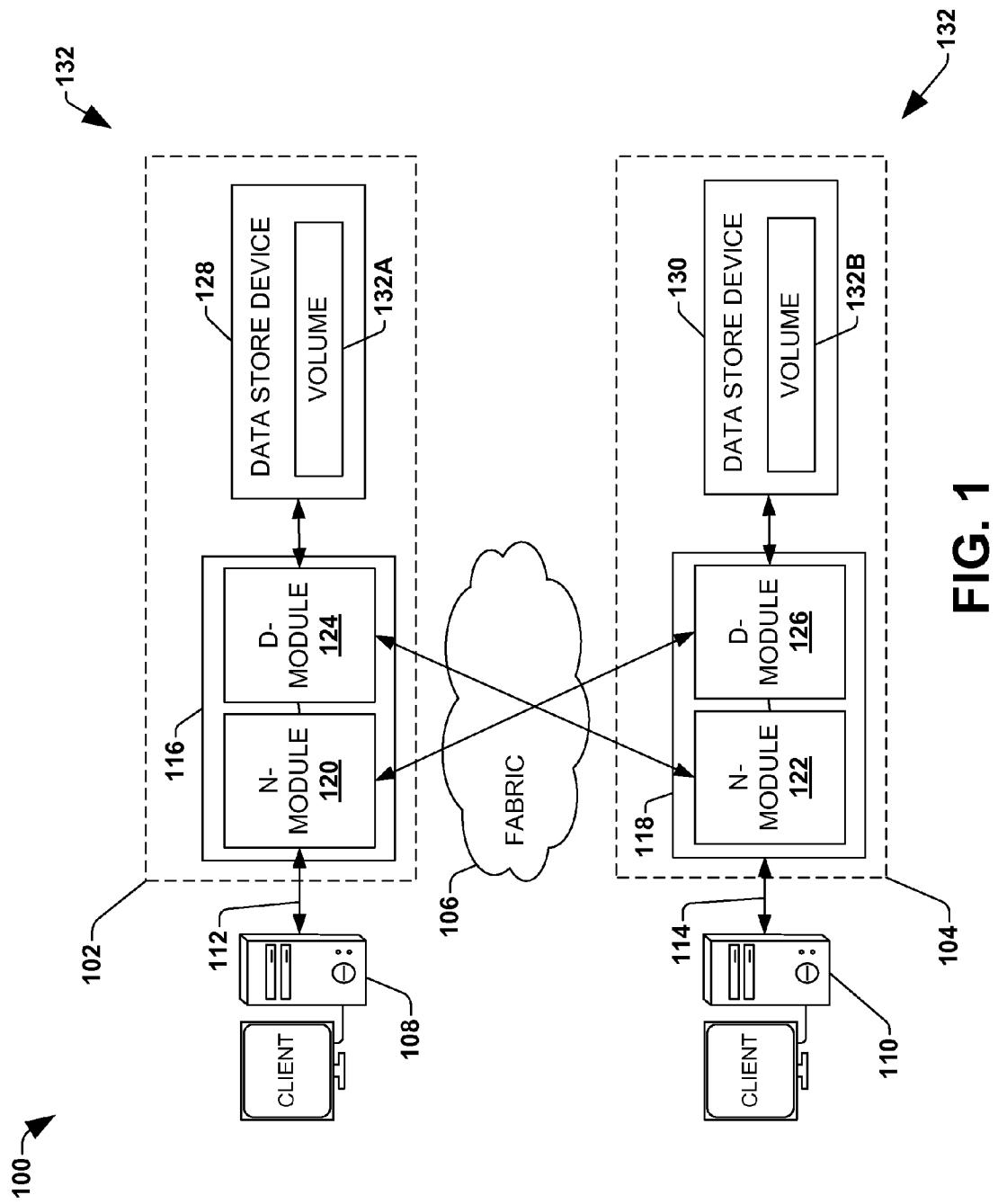
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A network may comprise one or more network storage systems (e.g., a storage controller comprising one or more storage devices, such as a storage drive). When a network storage system is installed on the network, the network storage system may initially lack configuration information, such as IP address, a system name, DNS server information, storage information (e.g., a storage device may be unformatted and/or lack data volumes), etc. If the network lacks a DHCP server, then the network storage system may not be assigned an IP address and thus devices on the network may be unable to communicate with the network storage system. For example, a network storage configuration tool, hosted by a device on the network, may be unable to detect and/or access the network storage system in order to configure the network storage system because the network storage system lacks an IP address used for communication over the network. Thus, a system administrator may have to physically connect to the network storage system (e.g., through a serial cable) in order to configure the network storage system, such as through command line instructions.

Accordingly, one or more techniques and/or systems for offering a network address to a network storage system within a network are provided herein. For example, a network assignment component is configured to listen for network discovery requests over the network. A device may request assignment of an IP address, for use in communicating over the network by the device, by sending a network discovery request. Responsive to receiving a network discovery request from a network storage system (e.g., a storage controller comprising one or more storage devices), the network assignment component may generate one or more candidate network addresses (e.g., candidate IP addresses) until an available candidate network address is generated. For example, the network assignment component may randomly generate a first candidate network address. The network assignment component may send an address resolution protocol request across the network using the first candidate network address. If an address resolution protocol reply is received, then the first candidate network address is unavailable (e.g., a device, from which the address resolution protocol reply is received, may be using the first candidate network address for communication over the network) and a new candidate network address is generated and evaluated for availability. If a timeout occurs with respect to the address resolution protocol request (e.g., no address resolution protocol reply is received within a timeout threshold), then the first candidate network address is determined to be the available candidate network address. The network assignment component sends a network assignment offer, specifying the available candidate network address, to the network storage system. In this way, the available candidate network address may be assigned to the network storage system as an initial configuration network address. A storage system configuration tool may be configured to provide configuration access to the network storage system based upon the initial configuration network address.

To provide context for configuring a network storage system, FIG. 1 illustrates an embodiment of a clustered network environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of a storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that in one example, a network address assignment component and/or a storage system configuration tool may be implemented within the clustered network environment 100. For example, the network address assignment component and/or the storage system configuration tool may be hosted by client 108 and/or client 110. The network address assignment component and/or the storage system configuration tool may be configured to detect and/or configure a network storage system, such as data storage system 102 and/or data storage system 104, for example.

Figure 2:
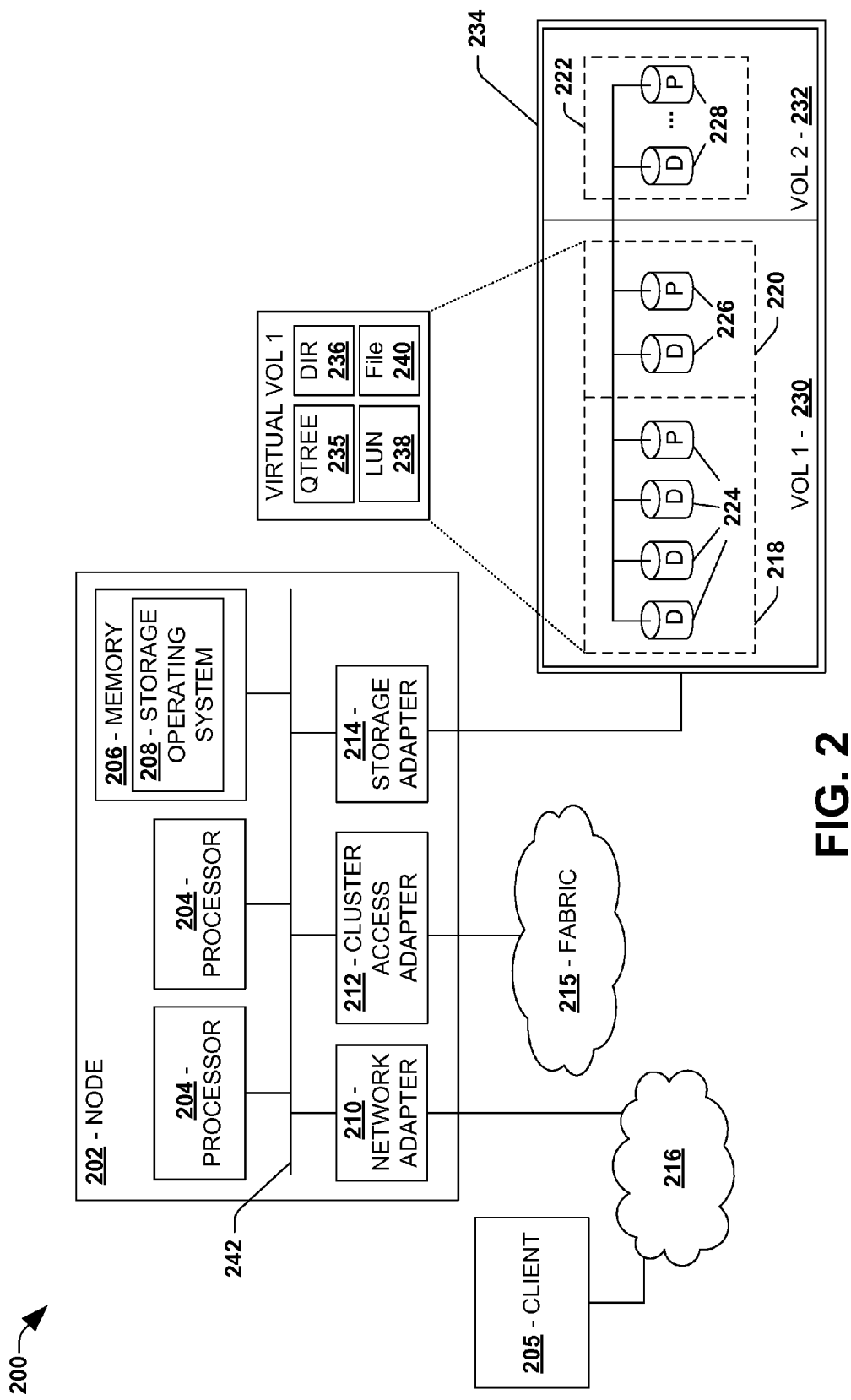
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the host 202 can respond to client requests to manage data on the data storage device 234 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that in one example, a network address assignment component and/or a storage system configuration tool may be implemented within network 216 or any other type of network (e.g., a home network, an enterprise network, etc.). For example, the network address assignment component and/or the storage system configuration tool may be hosted by client 205. The network address assignment component and/or the storage system configuration tool may be configured to detect and/or configure a network storage system, such as data storage system 200 and/or node 202, for example.

Figure 3:
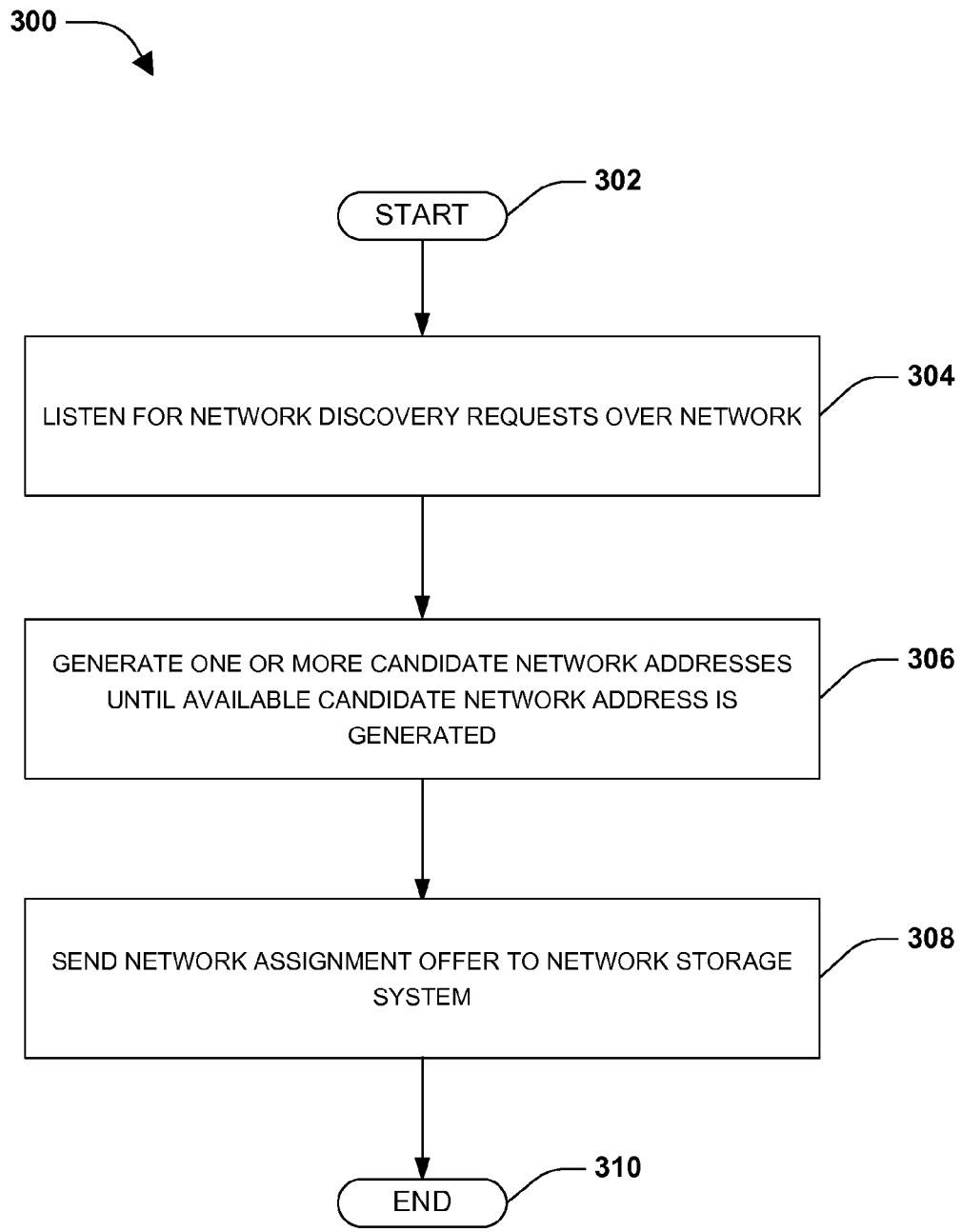
FIG. 3 is a flow chart illustrating an exemplary method of offering a network address to a network storage system within a network.

One embodiment of offering a network address to a network storage system within a network is illustrated by an exemplary method 300 of FIG. 3. At 302, the method starts. In an example, the network storage system may be connected to a network that may not comprise a dedicated IP assignment server, such as a DHCP server. Thus, when the network storage system sends a network discovery request across the network for an assignment of a network address, such as an IP address, no response or assignment may be received by the network storage system. Accordingly, as provided herein, a network discovery requests may be listened for over the network, at 304. In an example, a network address assignment component, hosted by a device on the network (e.g., a non-DHCP server device, such as a network administrator computing device) may listen for network discovery requests using DHCP functionality. Because the device may not comprise a dedicated DHCP server, the DHCP functionality may be implemented by the device in a stateless temporary manner (e.g., the DHCP functionality may be merely implemented for assignment of an initial configuration network address to a newly installed network storage system for configuration purposes). In an example, network discovery requests may be filtered based upon a set of machine address code (MAC) addresses. The set of MAC addresses may correspond to MAC addresses of a particular type of computing device such as storage network systems, as opposed to other devices that may be connected to the network. In another example, a range of IP addresses, such as a subnet of the network, within the network are listened for to detect network discovery requests.

Responsive to receiving a network discovery request from a network storage system, one or more candidate network address may be generated until an available candidate network address is generated, at 306. In an example, the one or more candidate network addresses are generated according to a random generation technique, which may mitigate generation of addresses within a sequential address range that are unavailable (e.g., already assigned to other devices within the network). In an example of generating a candidate network address, a first candidate network address, such as a randomly generated IP address, may be generated. A determination may be made as to whether the first candidate network address is being utilized by at least one device on the network. If the first candidate network address is not being utilized, then the first candidate network address is determined to be the available candidate network address, otherwise the first candidate network address is determined to be unavailable (e.g., and thus a new candidate network address may be generated and/or evaluated for availability). In an example of evaluating the first candidate network address for availability, an address resolution protocol request may be sent across the network. The address resolution protocol request may be associated with the first candidate network address. If an address resolution protocol reply to the address resolution protocol request is received from a device, then the first candidate network address may be determined as unavailable because the device is using the first candidate network address for communication over the network. In contrast, if a timeout occurs with respect to the address resolution protocol request (e.g., no address resolution protocol reply is received before a timeout threshold occurs), then the first candidate network address may be determined as the available candidate network address.

At 308, a network assignment offer may be sent to the network storage system. The network assignment offer may specify that the available candidate network address is available for use by the network storage system over the network. Responsive to receiving a network assignment request from the network storage system in response to the network assignment offer (e.g., the network assignment request specifies that the network storage system requests assignment of the available candidate network address), a network assignment acknowledgment may be sent to the network storage system. The network assignment acknowledgment may assign the available candidate network address to the network storage system as an initial configuration network address.

In an example, the initial configuration network address may be used, such as by a storage system configuration tool, to communicate with the network storage system over the network. In this way, configuration access may be provided to the network storage system based upon the initial configuration network address. In an example, a storage configuration graphical user interface may be provided (e.g., to an administrator). The administrator may configure various aspects of the network storage system over the network using the storage configuration graphical user interface, such as a system name, a system password, a default gateway, a domain name, a network interface, a domain name server (DNS), storage device configuration information, storage volume configuration information, a storage protocol, and/or other aspects of the network storage system. At 310, the method ends.

In an example of configuring a network storage system within a network, a network discovery request may be received from the network storage system over the network (e.g., a network lacking a dedicated DHCP server). A candidate network address may be identified as an available candidate network address (e.g., an IP address not utilized by at least one device on the network) based upon a timeout associated with an address resolution protocol request for the candidate network address. For example, the candidate network address may be randomly generated. The address resolution protocol request may be sent over the network to determine whether a device is using the candidate network address. Responsive to a timeout for the address resolution protocol request (e.g., as opposed to a receiving an address resolution protocol reply to the address resolution protocol request from a device currently using the candidate network address), the candidate network address may be determined as available for use by the network storage system. The available candidate network address may be assigned to the network storage system as an initial configuration network address. Configuration access maybe provided to the network storage system based upon the initial configuration network address.

Figure 4:
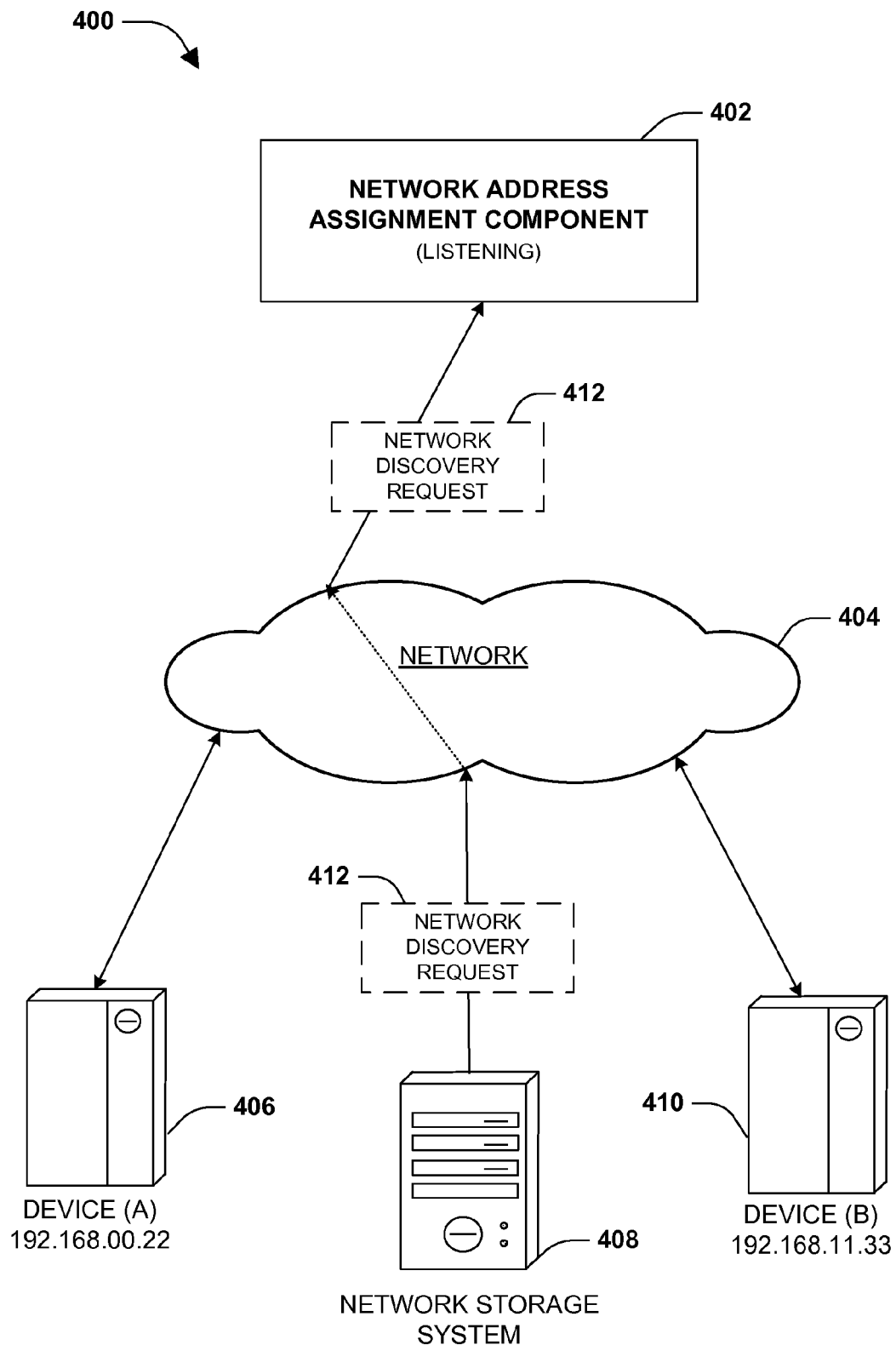
FIG. 4 is an illustration of an example of listening for network discovery requests.

FIG. 4 illustrates an example of a system 400 for offering a network address to a network storage system 408 within a network 404. The system 400 comprises a network address assignment component 402 connected to the network 404. In an example, the network 404 comprises a device (A) 406, a device (B) 410, and/or other devices not illustrated. The device (A) 406 may be assigned a first IP address 192.168.00.22 for communication over the network 404. The device (B) 410 may be assigned a second IP address 192.168.11.33 for communication over the network 404. In an example, the network 404 does not comprise a dedicated DHCP server (e.g., static IP address may be manually assigned by an administrator of the network 404).

The network address assignment component 402 may be configured to listen for network discovery requests over the network 404. In an example, the network storage system 408 may be connected to the network 404. The network storage system 408 may be newly introduced to the network 404, and thus may lack configuration, such as network configuration information used to communicate over the network 404. Accordingly, the network storage system 408 may send a network discovery request 412 over the network 404. The network address assignment component 402 may receive the network discovery request 412. Responsive to receiving the network discovery request 412, the network address assignment component 402 may be configured to identify an available candidate network address (e.g., FIGS. 5 and 6).

Figure 5:
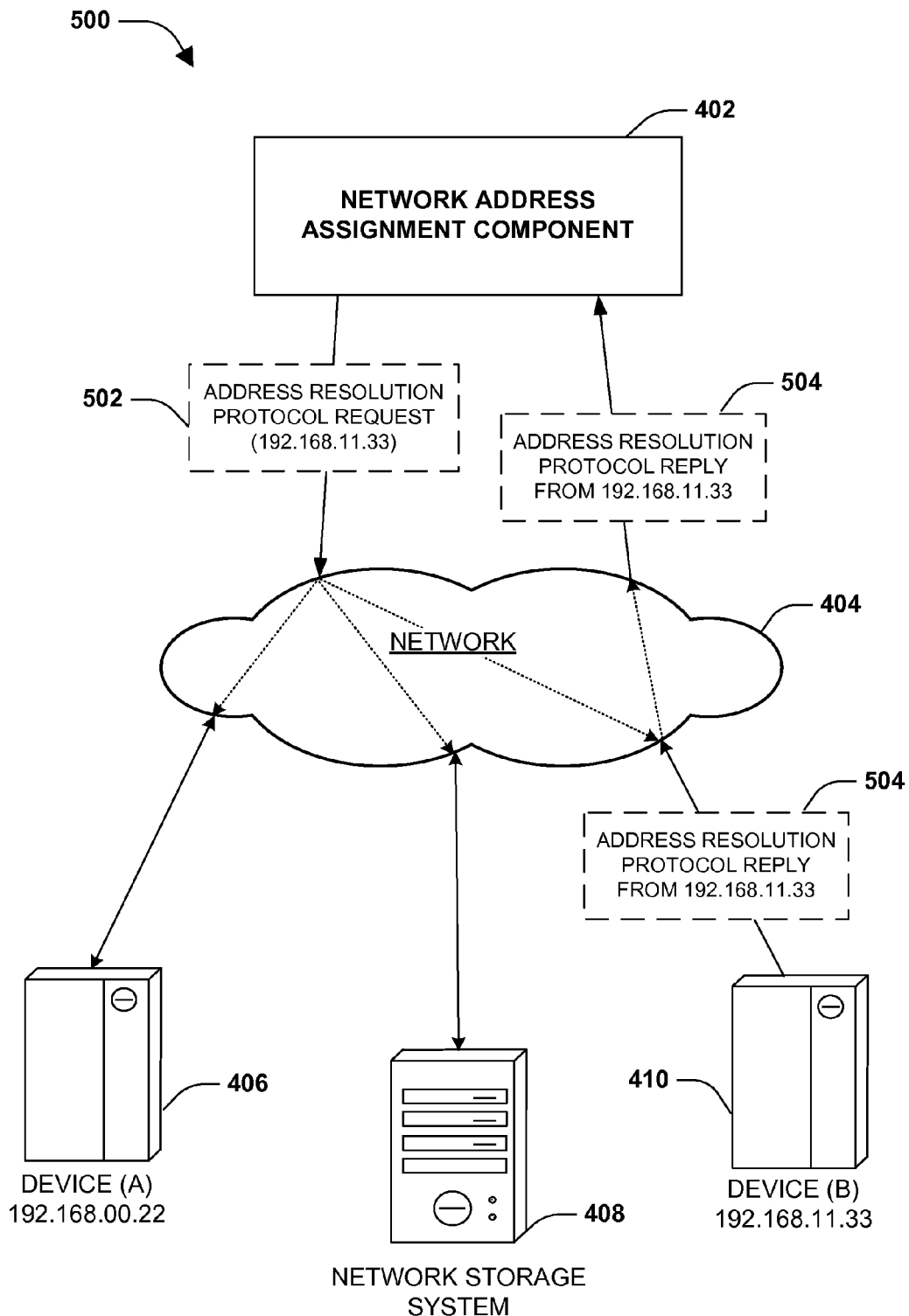
FIG. 5 is an illustration of an example of identifying an available candidate network address.

FIG. 5 illustrates an example 500 of identifying an available candidate network address. In an example, the network address assignment component 402 may have received the network discovery request 412 from the network storage system 408 (e.g., FIG. 4). The network address assignment component 402 may generate a first candidate network address 192.168.11.33. For example, the first candidate network address 192.168.11.33 may be randomly generated by the network address assignment component 402. The network address assignment component 402 may determine whether the first candidate network address 192.168.11.33 is available (e.g., not used by at least one device on the network 404) or unavailable (e.g., already used by at a device on the network 404). For example, the network address assignment component 402 may send an address resolution protocol request 502, corresponding to the first candidate network address 192.168.11.33, over the network 404. Device (B) 410 may receive the address resolution protocol request 502, and may issue an address resolution protocol reply 504 because device (B) 410 uses the second IP address 192.168.11.33, matching the first candidate network address 192.168.11.33, to communicate over the network 404. Responsive to receiving the address resolution protocol reply 504 from the device (B) 410, the network address assignment component 402 may determine that the first candidate network address 192.168.11.33 is unavailable. Accordingly, the network address component 402 may randomly generate a second candidate network address for evaluation (e.g., FIG. 6).

Figure 6:
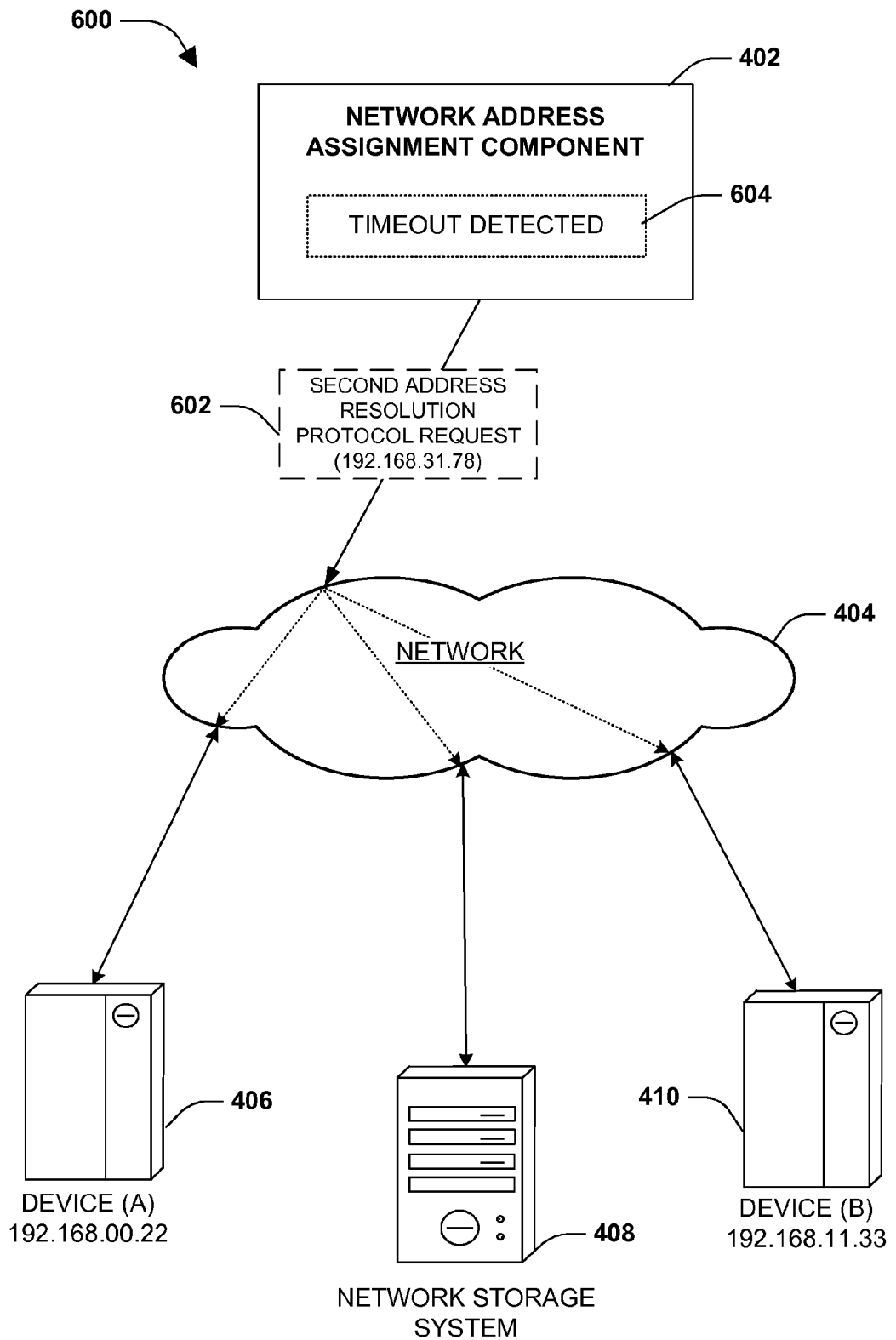
FIG. 6 is an illustration of an example of identifying an available candidate network address.

FIG. 6 illustrates an example 600 of identifying an available candidate network address. In an example, the network address assignment component 402 may have determined that the first candidate network address 192.168.11.33 was unavailable based upon receiving the address resolution protocol reply 504 from device (B) 410 (e.g., FIG. 5). Accordingly, the network address assignment component 402 may generate a second candidate network address 192.168.31.78 (e.g., a randomly generated IP address). The network address assignment component 402 may determine whether the second candidate network address 192.168.31.78 is available (e.g., not used by at least one device on the network 404) or unavailable (e.g., already used by a device on the network 404). For example, the network address assignment component 402 may send a second address resolution protocol request 602, corresponding to the second candidate network address 192.168.31.78, over the network 404. Responsive to detecting a timeout 604 associated with the second address resolution protocol request 602 (e.g., the network address assignment component 402 may not receive an address resolution protocol response within a timeout threshold), the network address assignment component 402 may determine that the second candidate network address 192.168.31.78 is available for use by the network storage system 408. In this way, the second candidate network address 192.168.31.178 is determined to be an available candidate network address 192.168.31.78. Accordingly, the network address component 402 may offer the available candidate network address 192.168.31.78 to the network storage system 408 (e.g., FIG. 7).

Figure 7:
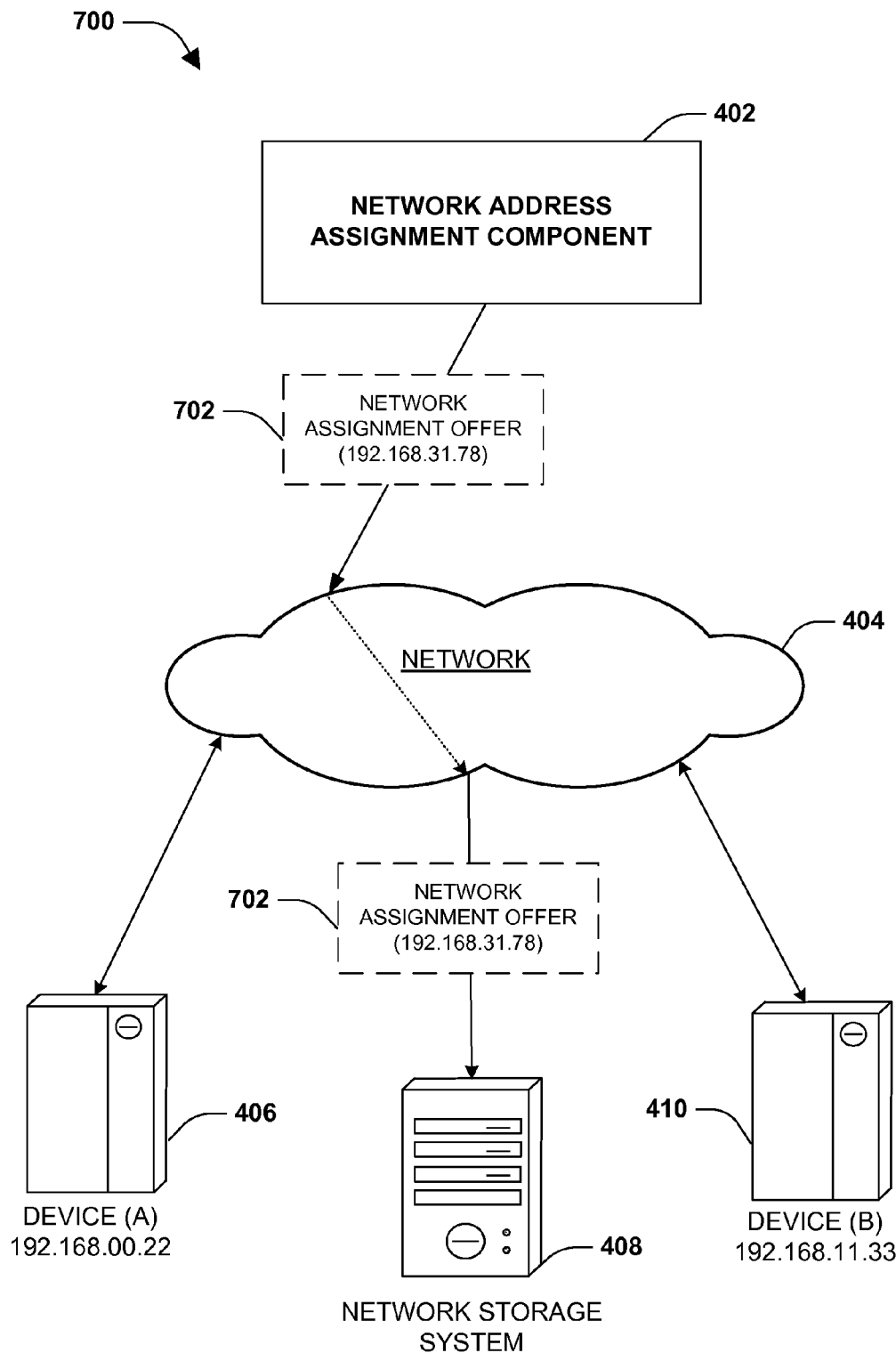
FIG. 7 is an illustration of an example of offering an available candidate network address to a network storage system.

FIG. 7 illustrates an example 700 of offering an available candidate network address to the network storage system 408. In an example, the network address assignment component 402 may have determined that the second candidate network address 192.168.31.78 is an available candidate network address 192.168.31.78. Accordingly, the network address assignment component 402 may send a network assignment offer 702, corresponding to the available candidate network address 192.168.31.78, over the network such that the network assignment offer 702 reaches the network storage system 408. In this way, the network storage system 408 may request assignment of the available candidate network address 192.168.31.78 from the network address assignment component 402 (e.g., FIG. 8).

Figure 8:
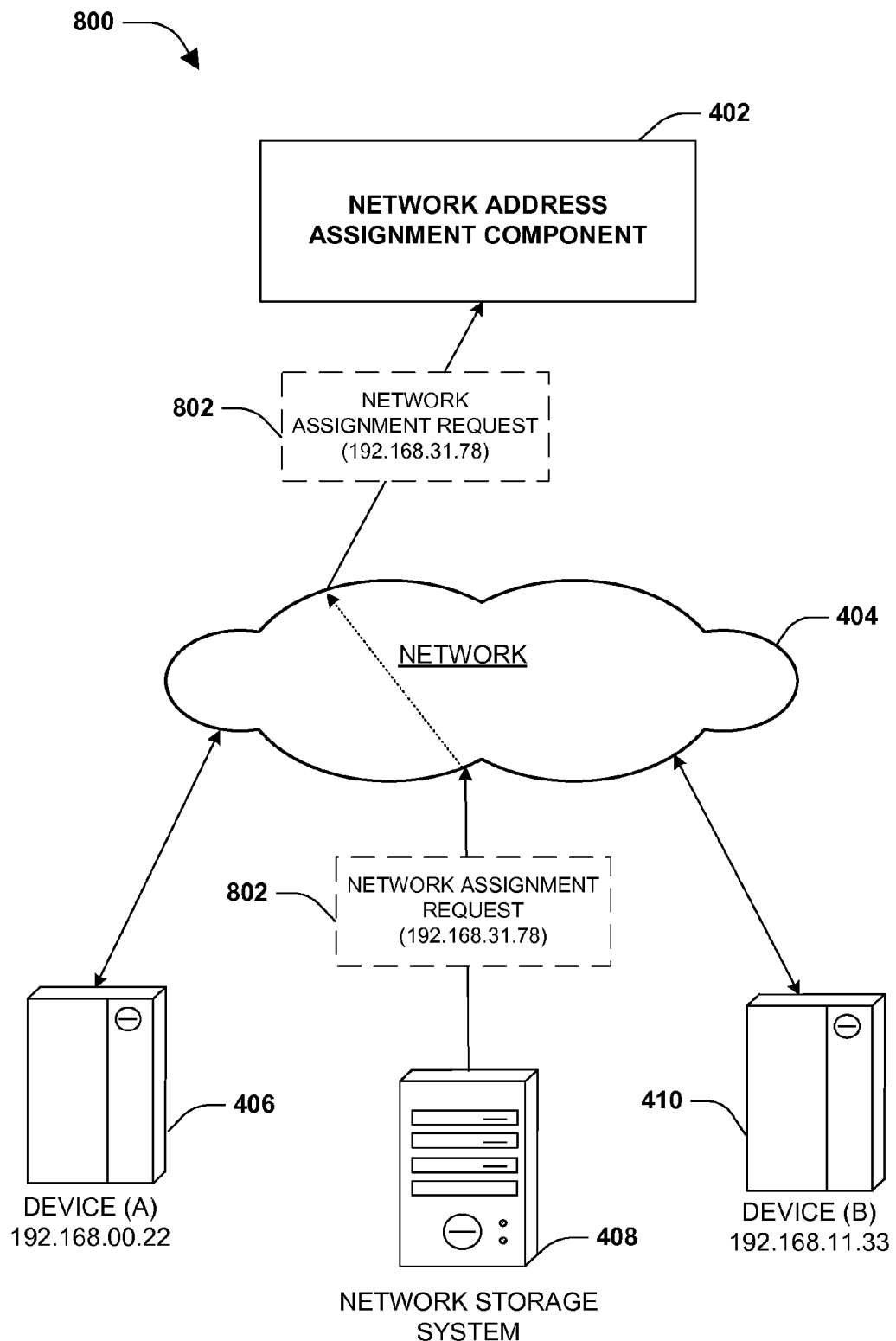
FIG. 8 is an illustration of an example of receiving a network assignment request from a network storage system.

FIG. 8 illustrates an example 800 of receiving a network assignment request 802 from the network storage system 408. In an example, the network address assignment component 402 may have sent the network assignment offer 702 to the network storage system 408 (e.g., FIG. 7). The network storage system 408 may respond to the network assignment offer 702 by sending a network assignment request 802 to the network address assignment component 402. The network assignment request 802 may request that the network address assignment component 402 assign the available candidate network address 192.168.31.78 to the network storage system 408 (e.g., FIG. 9).

Figure 9:
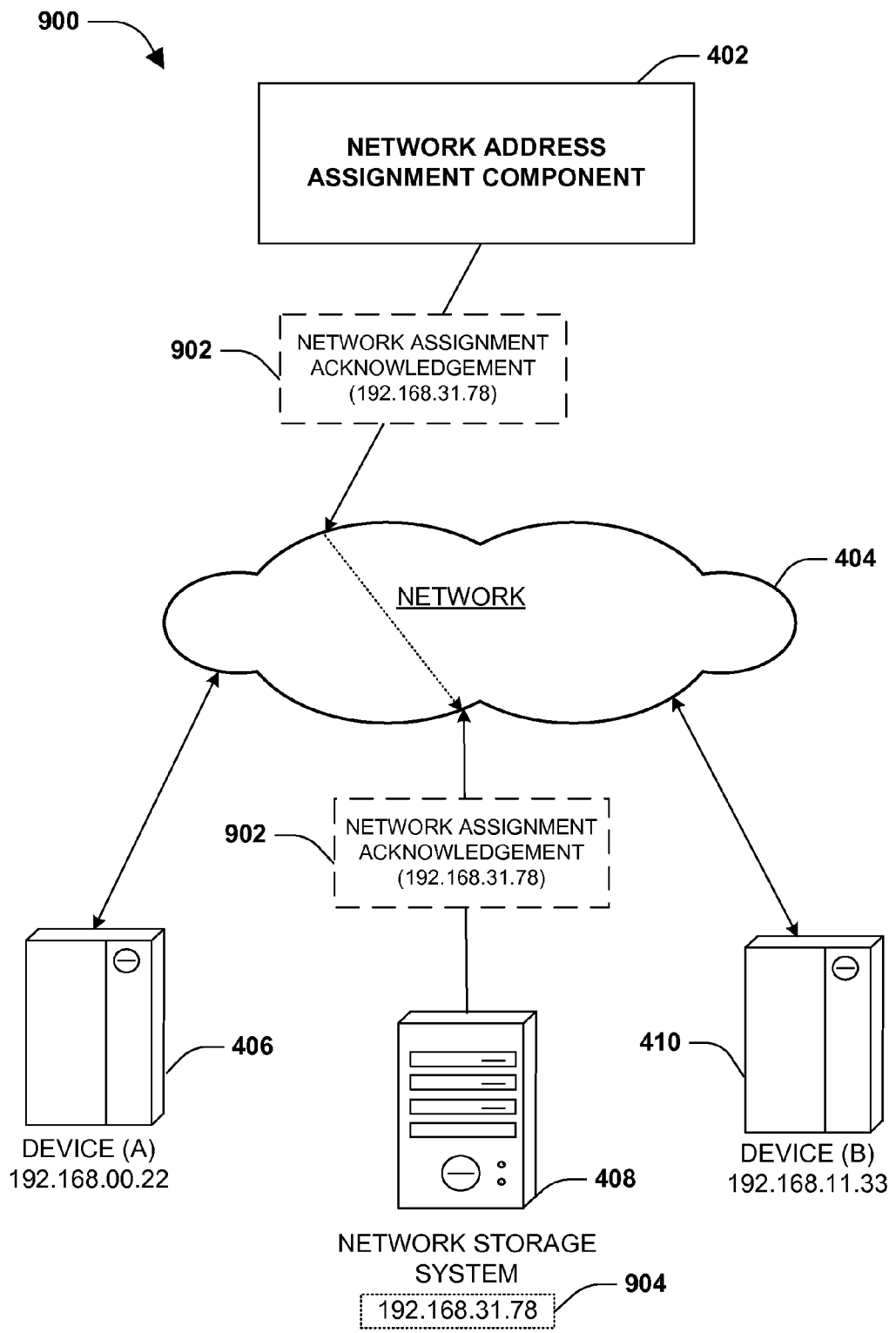
FIG. 9 is an illustration of an example of assigning an available candidate network address to a network storage system.

FIG. 9 illustrates an example 900 of assigning an available candidate network address to the network storage system 408. In an example, the network address component 402 may have received the network assignment request 802 from the network storage system 408 (e.g., FIG. 8). The network address assignment component 402 may send a network assignment acknowledgment 902 to the network storage system 408 in response to the network assignment request 802. The network assignment acknowledgment 902 may assign the available candidate network address 192.168.31.78 to the network storage system 408 as an initial configuration network address 904. The network storage system 408 may utilize the initial configuration network address 904 to communicate over the network 404 (e.g., FIG. 10A).

Figure 10A:
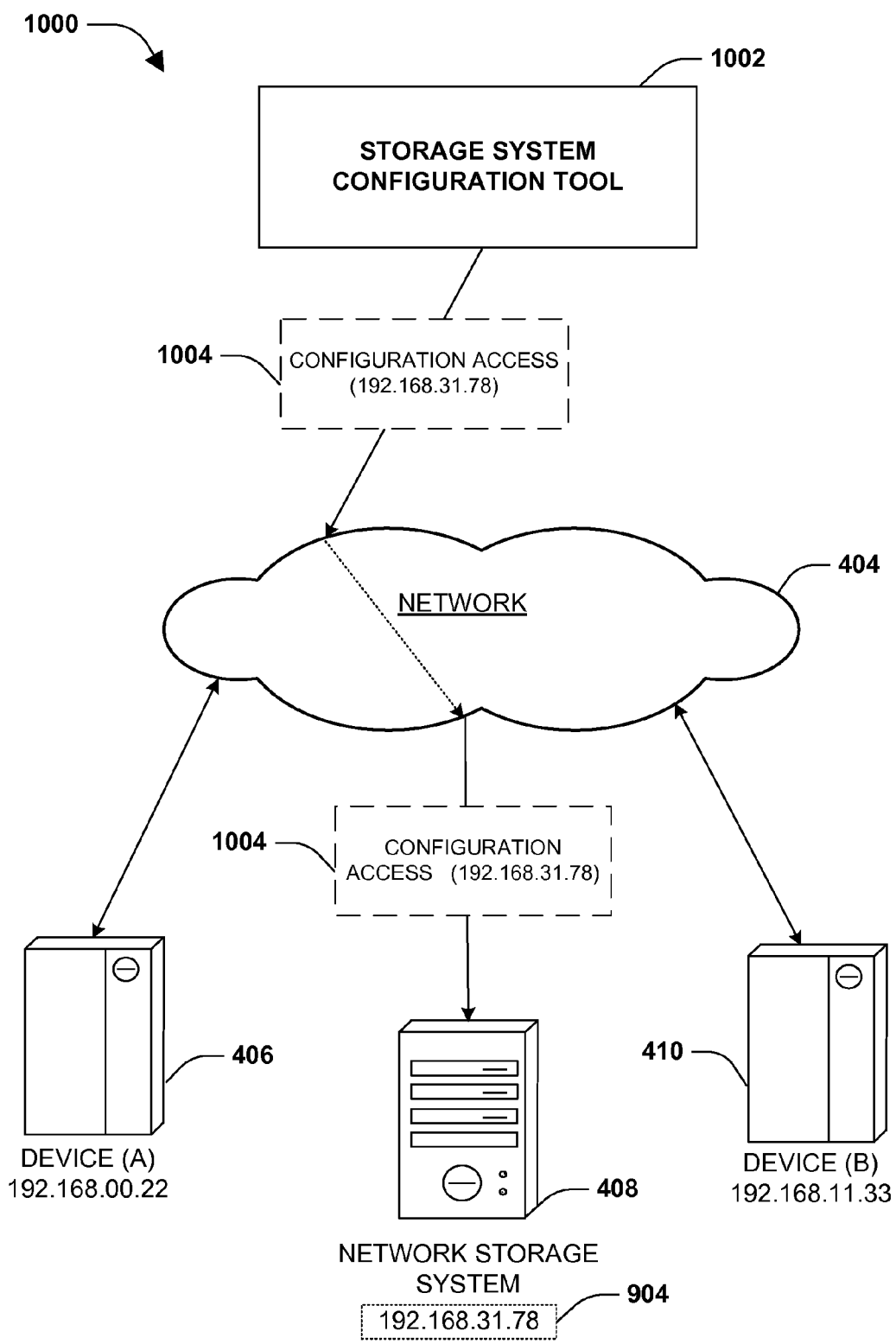
FIG. 10A is an illustration of an example of configuring a network storage system.
Figure 10B:
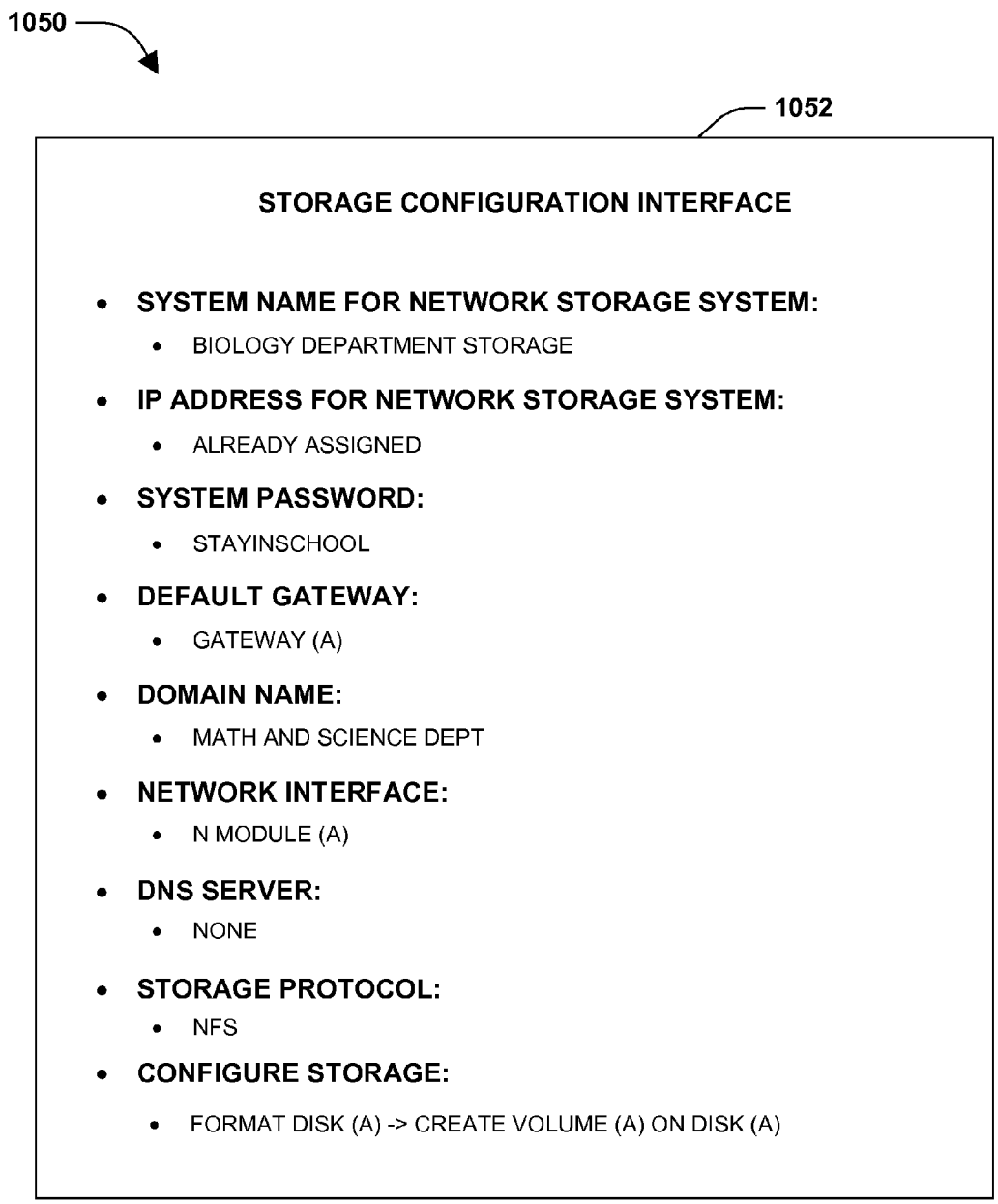
FIG. 10B is an illustration of an example of a storage configuration interface.

FIG. 10A illustrates an example 1000 of configuring the network storage system 408. In an example, the network storage system 408 may utilize the initial configuration network address 904, assigned by the network address assignment component 402, to communicate over the network 404 (e.g., FIG. 9). Because the network storage system 408 may initially lack configuration, a storage system configuration tool 1002 may provide configuration access 1004 to the network storage system 408 using the initial configuration network address 904. For example, the storage system configuration tool 1002 may provide a storage configuration interface 1052 that may be used to configure various aspects of the network storage system 408 utilizing the configuration access 1004, as illustrated in example 1050 of FIG. 10B. The storage configuration interface 1052 may be used to specify a system name for the network storage system 408, an IP address for the network storage system 408, a system password, a default gateway, a domain name, a network interface, a DNS server, one or more storage protocols (e.g., NFS, CIFS, iSCSI, etc.), storage configuration (e.g., a format instruction for a disk, a create volume instruction, etc.), and/or a variety of configuration information for the network storage system 408.

Figure 11:
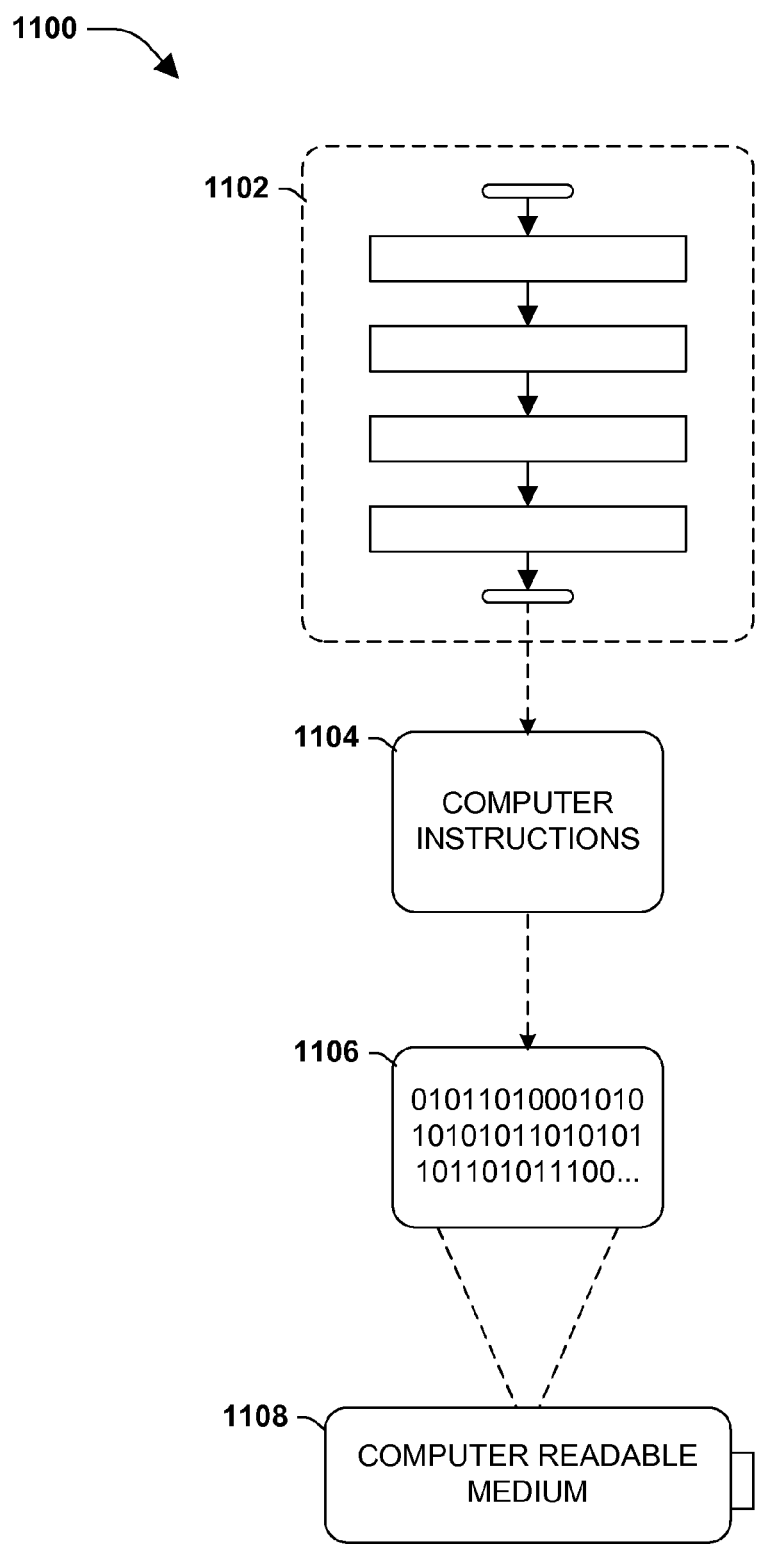
FIG. 11 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 11, wherein the implementation 1100 comprises a computer-readable medium 1108, such as a CD-R, DVD-R, flash drive, a platter of a hard disk drive, etc., on which is encoded computer-readable data 1106. This computer-readable data 1106, such as binary data comprising at least one of a zero or a one, in turn comprises a set of computer instructions 1104 configured to operate according to one or more of the principles set forth herein. In some embodiments, the processor-executable computer instructions 1104 are configured to perform a method 1102, such as at least some of the exemplary method 300 of FIG. 3, for example. In some embodiments, the processor-executable instructions 1104 are configured to implement a system, such as at least some of the exemplary systems of FIGS. 4, 5, 6, 7, 8, 9 and/or 10A, for example. Many such computer-readable media are devised by those of ordinary skill in the art that are configured to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component is localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for offering a network address to a network storage system within a network without using a dynamic host control protocol (DHCP) server, comprising:
   a memory containing non-transitory, machine readable medium comprising machine executable code having stored thereon instructions; and a hardware-based processor module coupled to the memory executes a network address assignment component that is configured to:
   listen for network discovery requests directly from the network storage system over the network having a plurality of devices without an operational DHCP server;
   responsive to receiving a network discovery request from the network storage system:
      generate one or more candidate network addresses until an available candidate network address is generated, comprising:
         generate a first candidate network address;
         determine whether the first candidate network address is being utilized by at least one device on the network by sending an address resolution protocol request associated with the first candidate network address to the plurality of devices of the network and receiving an address resolution protocol reply before an occurrence of a timeout with respect to the address resolution protocol request; and
         responsive to the first candidate network address not being utilized by at least one device on the network after an occurrence of the timeout with respect to the address resolution protocol request, determine that the first candidate network address is the available candidate network address, otherwise determine that the first candidate network address is not the available candidate network address;

send a network assignment offer to the network storage system, the network assignment offer specifying the available candidate network address for use by the network storage system; and assign the available candidate network address to the network storage system as an initial configuration network address; wherein the initial configuration network address is used to provide configuration access to the network storage system for configuring the network storage system by a storage system configuration tool to use a storage protocol and configure storage devices of the network storage system for storing data.

2. The system of claim 1, the network address assignment component further configured to:

responsive to receiving a network assignment request in response to the network assignment offer, send a network assignment acknowledgement to the network storage system.

3. The system of claim 1, wherein the storage system configuration tool provides a storage system configuration interface to configure the network storage system to use the storage protocol and configure the storage devices for storing data.

4. The system of claim 1, the network address assignment component hosted on a non-DHCP server device within the network.

5. The system of claim 1, the network address assignment component configured to listen to an IP address range within the network for the network discovery requests, the IP address range corresponding to a subnet of the network.

6. The system of claim 1, the network address assignment component configured to generate the one or more candidate network addresses according to a random generation technique.

7. The system of claim 1, the network address assignment component configured to filter network discovery requests based upon a set of machine address code (MAC) addresses.

8. The system of claim 3, the storage system configuration tool configured to:

provide a storage configuration graphical user interface configured to provide configuration access for setting at least one of a system name, a system password, a default gateway, a domain name, a network interface, or storage volume configuration for the network storage system.

9. A method for offering a network address to a network storage system within a network having a plurality of devices without using a dynamic host control protocol (DHCP) server, comprising:

listening for network discovery requests from the network storage system over the network;

responsive to receiving a network discovery request from the network storage system:

generating one or more candidate network addresses until an available candidate network address is generated, the generating comprising:

generating a first candidate network address;

determining whether the first candidate network address is being utilized by at least one device on the network by sending an address resolution protocol request across the network; and receiving an address resolution protocol reply before an occurrence of a timeout with respect to the address resolution protocol request; and responsive to the first candidate network address not being utilized by least one device on the network after identifying an occurrence of the timeout with respect to the address resolution protocol request, determining that the first candidate network address is the available candidate network address, otherwise determining that the first candidate network address is not the available candidate network address;

sending a network assignment offer to the network storage system, the network assignment offer specifying the available candidate network address for use by the network storage system; and assigning the available candidate network address to the network storage system as an initial configuration network address; wherein the initial configuration network address is used to provide configuration access to the network storage system for configuring the network storage system by a storage system configuration tool to use a storage protocol and configure storage devices of the network storage system for storing data.

10. The method of claim 9, the generating one or more candidate network addresses comprising:

randomly generating the one or more candidate network addresses.

11. The method of claim 9, comprising:

responsive to receiving a network assignment request in response to the network assignment offer, sending a network assignment acknowledgement, and then assigning the available candidate network address to the network storage system as the initial configuration network address; and providing configuration access to the network storage system based upon the initial configuration network address.

12. A non-transitory, computer readable medium comprising instructions which when executed at least in part via a processing unit perform a method for configuring a network storage system within a network having a plurality of devices without a dynamic host control protocol (DHCP) server, comprising:

listening for network discovery requests from the network storage system over the network;

responsive to receiving a network discovery request from the network storage system over the network, identifying a candidate network address as an available candidate network address not utilized by at least one device on the network based upon a timeout associated with an address resolution protocol request for the candidate network address sent to the plurality of devices of the network;

assigning the available candidate network address to the network storage system as an initial configuration network address; and providing configuration access to the network storage system based upon the initial configuration network address to use a storage protocol and configure storage devices of the network storage system for storing data.

13. The non-transitory medium of claim 12, wherein the candidate network address is generated randomly.

14. The non-transitory medium of claim 12, further comprising:

sending a network assignment offer to the network storage system, the network assignment offer specifying the available candidate network address for use by the network storage system; and responsive to receiving a network assignment request in response to the network assignment offer, sending a network assignment acknowledgement.

15. The non-transitory medium of claim 12, further comprising:

determining whether the candidate network address is being utilized by at least one device on the network after receiving an address resolution protocol reply before an occurrence of the timeout with respect to the address resolution protocol request.

16. The non-transitory medium of claim 15, wherein listening for network discovery requests over the network includes listening to an IP address range within the network for the network discovery requests, the IP address range corresponding to a subnet of the network.

17. The non-transitory medium of claim 15, wherein the network discovery requests are filtered based upon a set of machine address code (MAC) addresses.

18. The method of claim 9, wherein configuration access is provided via a graphical user interface for generating at least one of a system name, a system password, a default gateway, a domain name, a network interface, or storage volume configuration.

19. The method of claim 9, wherein listening for network discovery requests over the network comprises listening to an IP address range within the network for the network discovery requests, the IP address range corresponding to a subnet of the network.

20. The method of claim 9, wherein the network discovery requests are filtered based upon a set of machine address code (MAC) addresses.

* * * * *